United States Patent [19]

Rancourt et al.

[11] Patent Number: 5,330,034
[45] Date of Patent: Jul. 19, 1994

[54] BRAKE ASSEMBLY

[76] Inventors: Claude Rancourt; Yvon Rancourt, both of 1400 54ième Rue Nord, St. Georges Ouest, Beauce County, Quebec, Canada, G5Y 2E1

[21] Appl. No.: 890,801

[22] Filed: Jun. 1, 1992

Related U.S. Application Data

[63] Continuation-in-part of Ser. No. 861,419, Mar. 31, 1992, abandoned.

[51] Int. Cl.$^5$ .................... F16D 65/12; F16D 65/24
[52] U.S. Cl. ................... 188/71.6; 188/72.6; 188/170; 188/106 F
[58] Field of Search ............ 188/170, 71.5, 71.6, 188/72.4, 72.6, 106 F, 18 A

[56] References Cited

U.S. PATENT DOCUMENTS

| 3,244,260 | 4/1966 | Frayer | 188/106 F X |
| 3,547,234 | 12/1970 | Cummins | 188/170 |
| 3,613,839 | 10/1971 | MacDuff | 188/170 X |
| 3,770,085 | 11/1973 | Cottingham | 188/170 X |
| 3,893,549 | 7/1975 | Bennett | 188/170 |
| 3,946,837 | 3/1976 | Houser | 188/170 X |
| 3,974,896 | 8/1976 | Rach | 188/170 |
| 4,102,438 | 7/1978 | Rancourt | 188/71.6 X |
| 5,205,380 | 4/1993 | Paquet et al. | 188/18 A |

FOREIGN PATENT DOCUMENTS

| 0038370 | 10/1981 | European Pat. Off. . |
| 0300756 | 1/1989 | European Pat. Off. . |
| 2174772 | 11/1986 | United Kingdom | 188/71.6 |

Primary Examiner—Matthew C. Graham
Assistant Examiner—Kevin D. Rutherford

[57] ABSTRACT

An improved truck disc brake using a spring loaded safety brake and a pneumatic bladder for releasing the safety brake as well as a service brake enhancing bladder and at least a pair of rotor brake discs. The brake discs are ventilated and include ventilation channels extending radially thereof and vent air is deflected into the brake assembly by means of a scoop on the exterior of the housing passing through openings in the housing and the rotor brake discs act as an impeller moving the ventilation air rearwardly thereof to dissipate the heat. A wear gauge is provided to determine the wear of the brake linings and a quick release valve is mounted in the brake assembly adjacent the pneumatic bladder related to the service brake, to quickly release the air when required. Temperature sensors are provided within the brake assembly to read the temperature of the brake assembly. A radial groove extends on the friction surface of the radial disc to provide an air cushion between the brake linings and the friction surface of the disc and to discharge debris.

22 Claims, 4 Drawing Sheets

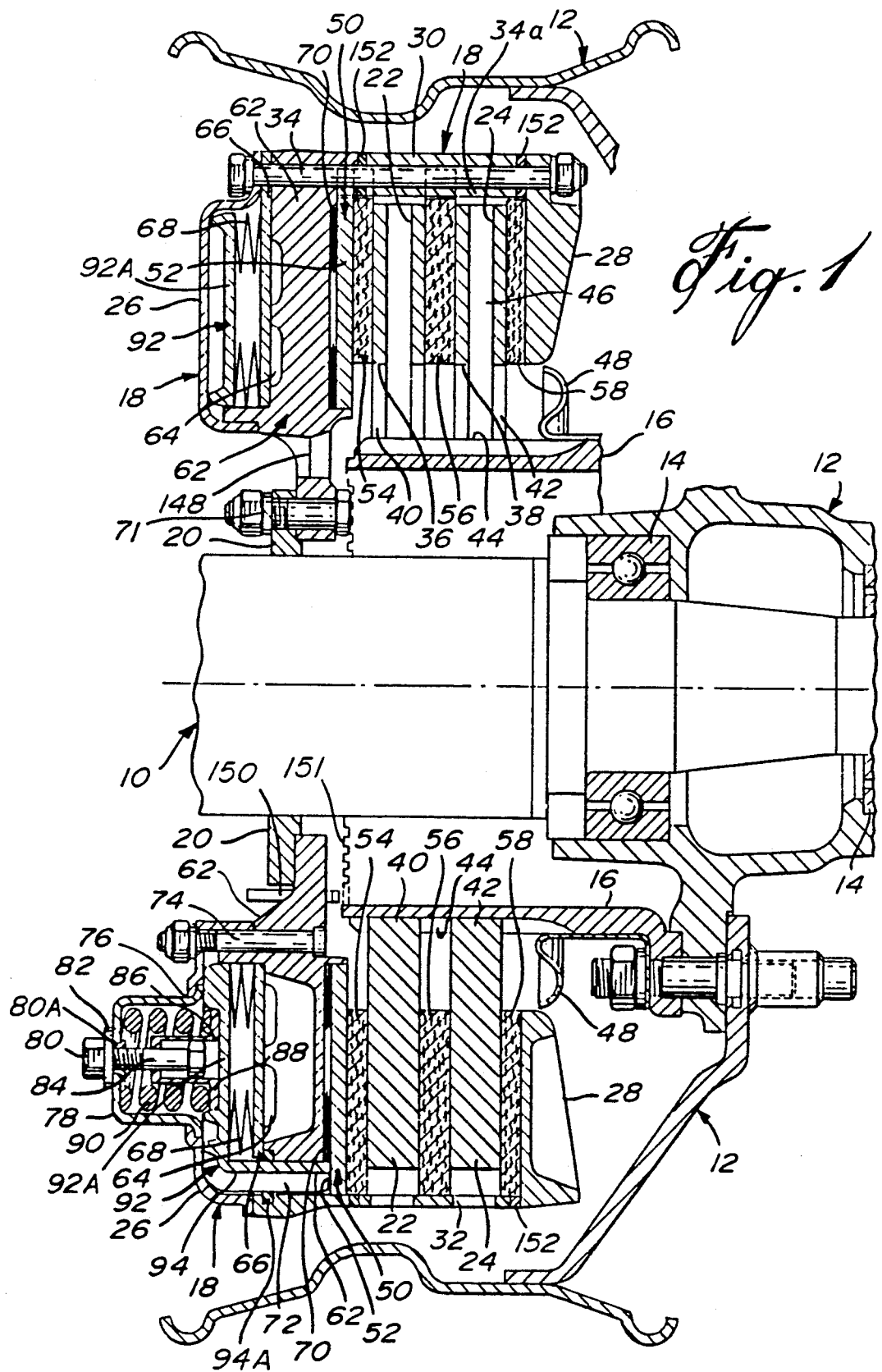

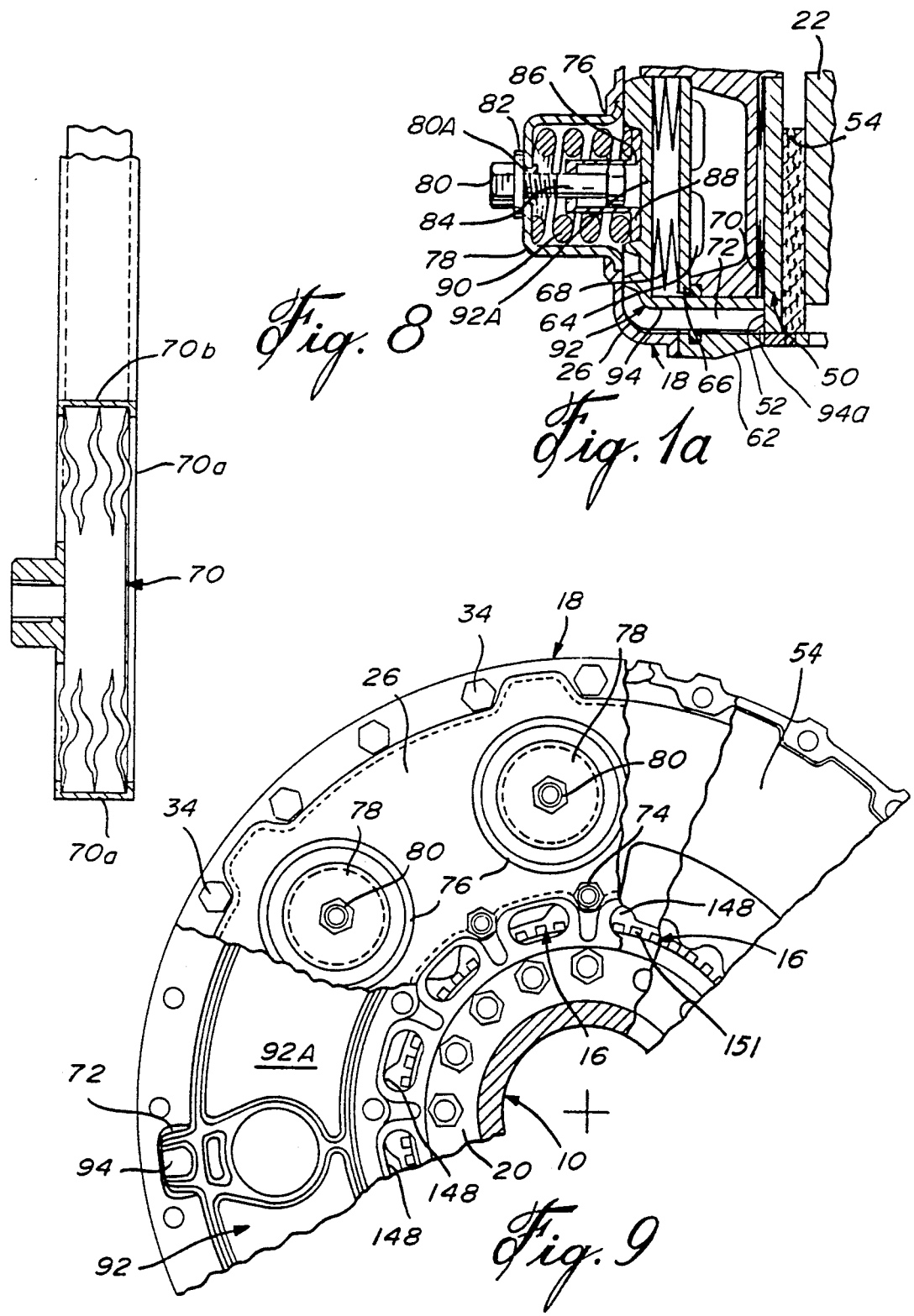

BRAKE ASSEMBLY

CROSS-REFERENCE TO RELATED APPLICATION

This is a continuation-in-part application of parent application Ser. No. 07/861,419 filed Mar. 31, 1992, now abandoned.

BACKGROUND OF THE INVENTION

1. Field of the Invention

The present invention relates to disc brakes and more particularly to improvements in large area contact disc brakes for larger vehicles such as trucks, tractor-trailer vehicles in addition to other large wheeled vehicles and aircrafts.

2. Description of the Prior Art

The improvements contemplated herein relate especially to a pneumatic disc brake as described in U.S. Pat. No. 4,102,438 issued Jul. 25, 1978, and U.S. Pat. No. 5,205,380, issued Apr. 27, 1993 herein incorporated by reference.

It is recognized that a major problem with large contact-area annular disc brakes of the type described in the above patents is heat. Great strides in improving heat dissipation were achieved with the introduction of vaned discs as described in U.S. Pat. No. 4,102,438. However, vented discs of the type described required a thicker disc to retain the same strength. A thicker disc increases the axial dimension required to house the disc or discs which is at a premium in an in-wheel, concentric brake system of the type described in U.S. Pat. No. 5,205,380. It was found for instance that it was not possible to house more than one cast-iron vented disc in such a housing, thus reducing the flexibility of design of such brakes, especially where multiple discs might be an advantage.

Another problem which has had a serious social impact is brake failure due to wear. Presently, there is no known reliable brake wear gauge for determining the remaining life of a particular set of brakes linings on a truck vehicle. It is necessary to remove housing parts on the wheel in order to examine and measure the remaining thickness of the lining and the brake disc. Since such examination adds to the down time of the truck or tractor-trailer, the tendency of the operator or driver-operator is to delay such inspection, with sometimes disastrous results, often costing innocent lives in highway accidents due to failed brakes of such large vehicles.

SUMMARY OF THE INVENTION

It is an aim of the present invention to provide an improved pneumatic disc brake of the type described in U.S. Pat. No. 5,205,380.

It is a further aim of the present invention to provide a disc brake assembly which has a greater capacity to dissipate heat.

It is still a further aim of the present invention to provide a disc brake assembly which has an improved means for monitoring temperature and wear in a brake assembly.

It is a further aim of the present invention to provide an aircraft disc brake assembly which has means to rotate the wheels of an aircraft to provide rotation of the wheels before touch down so that the rate of rotation approximates the rate of rotation after touch down.

A construction in accordance with the present invention comprises a brake assembly for a vehicle wheel having a brake housing adapted to be contained in the wheel, mounting means for securing the housing to the vehicle, at least an annular rotor disc mounted within the housing for rotation with the wheel, the disc having a plurality of circumferentially spaced channels extending from the periphery of the disc towards the center to communicate with central openings at the inner margin of the annular disc such that air can pass from the central openings at the inner margin of the annular disc to exhaust at the outer peripherey thereof in order to dissipate heat generated at the disc, means defining openings in the housing to allow air flow from the exterior of the housing through the housing openings, means for directing the air flow through the housing to the central openings in the disc, and deflector means mounted on the exterior of the housing for diverting air to the openings in the housing.

In another aspect of the present invention there is provided an annular rotor disc for a disc brake assembly having at least one radial planar braking surface, brake shoe means for engaging the braking surface of the disc, characterized in that at least a shallow groove extends across the braking surface generally radially thereof whereby an air cushion is provided between the rotor disc and the brake shoe means when the brake shoe means is released from the braking surface of the disc by reason of the "pumping" of the air from the center of the disc radially towards the periphery of the disc during rotation of the disc. The groove also acts, when the brake are being applied, as a channel for draining liquid and other debris resulting from the frictional contact of the brake shoe means and the braking surface.

In another aspect of the present invention a construction includes a disc brake assembly for a vehicle wheel wherein the wheel includes a hub journaled to an axle on the vehicle, the disc brake assembly is within the confines of the wheel and concentric with the axle, the disc brake assembly includes a housing mounted to the vehicle and at least a radial disc within the housing and means mounting the disc to the wheel, the disc having at least a first radial planar friction surface, a first brake shoe provided adjacent the first planar friction surface of the disc, movable axially towards and away from the first friction surface of the disc for friction engagement therewith and release thereof, means provided for restraining the first brake shoe from rotating with the disc, an intermediate wall member mounted within the housing and fixed thereto extending parallel with the radial disc and located such that the first brake shoe moves axially between the intermediate wall and the radial disc, a movable spring abutment means mounted for axial movement within the housing between the intermediate wall and the housing wall such that the intermediate wall is between the movable spring abutment means and the first brake shoe, pusher link members extending between the spring abutment means and the brake shoe passing through the intermediate wall such that the spring abutment means moves axially with the brake shoe, spring means extending between the housing wall and the spring abutment means such that the spring means urges against the spring abutment means to press the brake shoe against the friction surface of the disc, a first fluid bladder being provided between the intermediate wall and the spring abutment means whereby the first bladder when expanded forces the spring abutment means to overcome the spring means to release the brake shoe from the friction surface of the disc, thus releasing the parking brakes, a second bladder being provided between the intermediate wall and the brake shoe such that when expanded service brakes will be applied by the application of the brake shoe to the friction surface of the disc characterized in that quick release valve means are mounted to the intermediate wall and communicate with the second bladder in order to evacuate gas from the second bladder to accelerate the modulation of the second bladder and to circulate the gas along the intermediate wall in order to help dissipate heat therefrom.

In a more specific embodiment of the present invention thermal-sensing means are associated with the intermediate wall and with a housing wall and means are provided for communicating the data from the sensing means to a display means.

In a further aspect of the present invention there is provided a disc brake assembly for a vehicle wheel wherein the assembly comprises a brake housing defining an interior chamber, mounting means for securing the housing to a vehicle, at least an annular rotor disc mounted within the housing, the brake disc having at least one planar braking surface, means mounting the annular rotor disc to the wheel, at least one brake shoe means disposed within the housing on the planar braking surface side of the disc and mounted for axial movements towards and away from the disc, the brake shoe means including brake lining means adapted to be in contact with the planar braking surface, means provided for restraining the brake shoe means from rotating with the disc, a movable spring abutment means mounted for axial movement within the housing and rigid pusher link members extending between the spring abutment means and the brake shoe means, spring means extending between the housing wall and the spring abutment means such that the spring urges against the spring abutment means to press the brake shoe means against the first friction surface of the disc and a brake shoe wear sensing means including means indicating changes in the distance between the housing wall and the spring abutment means such that when the brake linings and disc have worn, such wear will be discernible from the brake wear sensing means.

In this specification, parking or safety brakes means the mechanism which allows the brakes to be applied when the vehicle is not in use or a malfunction should occur in the operation of the service brakes. Active or service brakes refers to the mechanism which provides for the brakes to be applied directly by the operator to slow the vehicle when moving on to bring it to a halt. It is understood that vehicle includes aircraft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a fragmentary axial cross-section taken through a brake assembly in accordance with the present invention;

FIG. 1a is an enlarged fragmentary cross-section of a detail of a spring abutment member of the brake assembly;

FIG. 8 is an enlarged fragmentary cross-section of a detail shown in FIG. 1.; and FIG. 9 is an enlarged fragmentary front elevation of the brake assembly with parts removed to view further details of the present invention.

DESCRIPTION OF THE PREFERRED EMBODIMENTS

Figure 2:
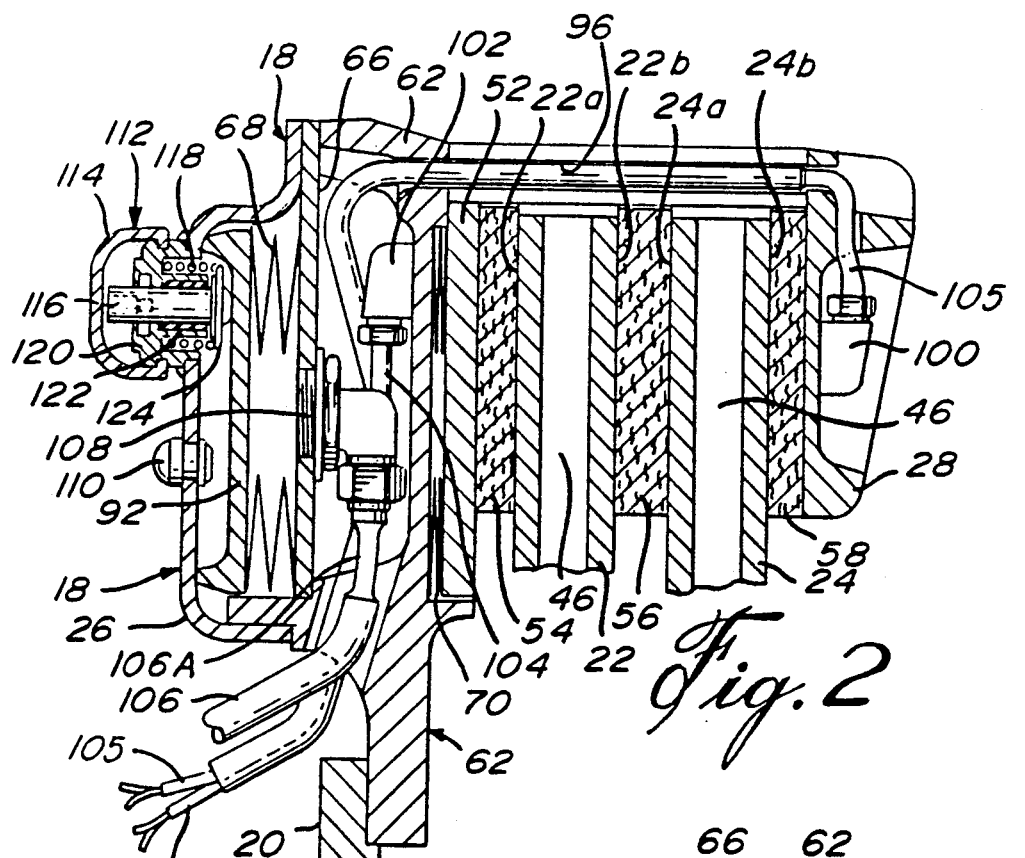
FIG. 2 is an enlarged fragmentary cross-section of a detail of the brake assembly.
Figure 3:
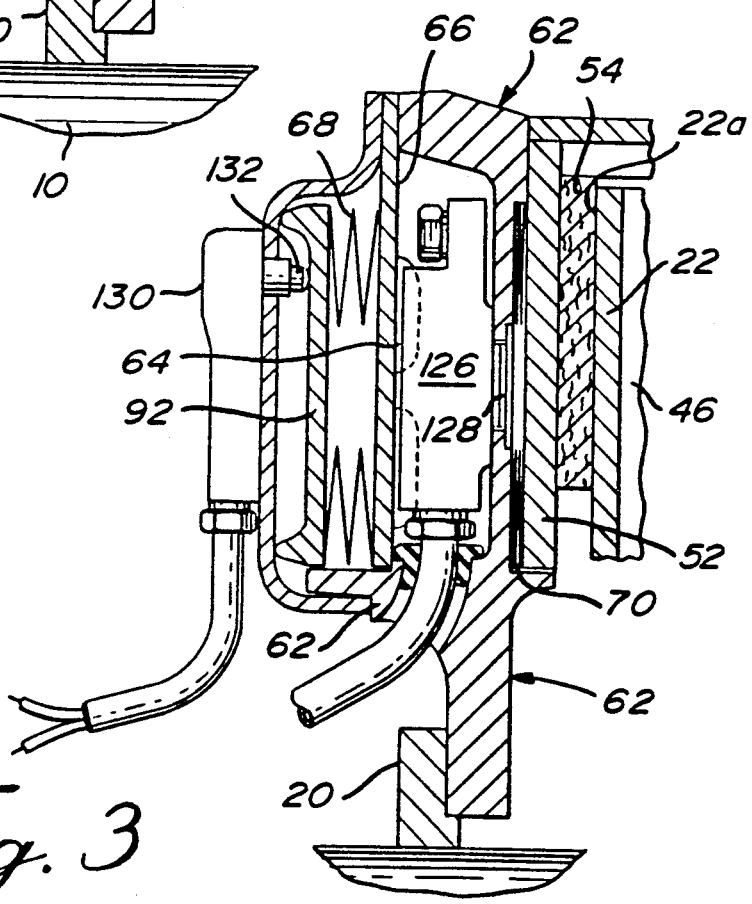
FIG. 3 is a further fragmentary enlarged axial cross-section taken of a further detail of the brake assembly.
Figure 5:
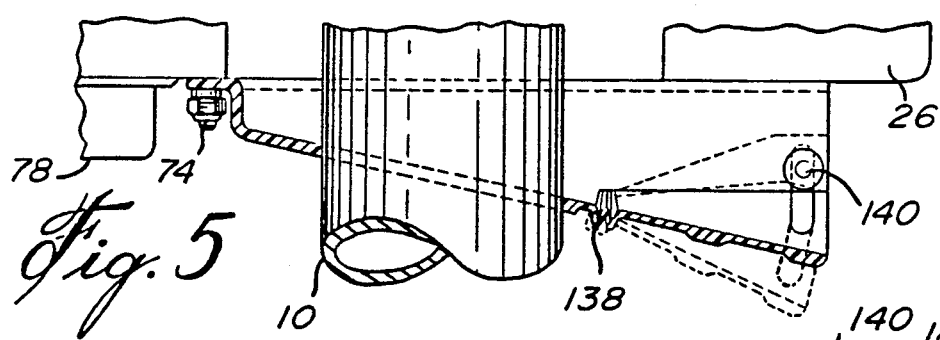
FIG. 5 is a horizontal cross-section taken along lines 5—5 of FIG. 4.

Referring to FIGS. 1 to 3 the wheel assembly is shown with an axle 10. Axle 10 is a dead axle and bearings 14 mount the wheel 12 for rotation thereabout. An adapter sleeve 16 is mounted to the wheel 12 and extends concentrically over the axle 10 within the disc brake housing 18. A mounting ring 20 is fixed to the axle 10 and the housing 18 is mounted to the mounting ring 20. Two radial vented rotor discs 22 and 24 are shown within the housing 18. The housing 18 includes an annular housing wall 26 on the inboard side of the assembly, an annular housing wall 28 on the outboard side, and the whole is surrounded by a peripheral wall 30. Ventilation openings 32 are provided in the peripheral wall 30. Nut and bolt arrangements 34 secure the housing walls 26, 28, 30 and intermediate wall 62 together to form the housing 18.

The adapter sleeve 16 has axial splines 44 and the annular rotor brake discs 22 and 24 include disc openings 36 and 38 at the inner margins, respectively and the openings are interspersed with teeth 40 and 42. The teeth 40 and 42 engage the splines 44, thereby providing limited axial movement to the discs 22 and 24 while entraining the discs with the wheel 12.

Each brake disc 22 and 24 is provided with generally radial vent channels 46. It has been found that it is possible to maintain brake discs having vented channels within reasonable axial dimensions or thickness, by making the discs out of a composite of aluminum called "DURALCAN". Thus, it is possible to provide two or more brake discs in a space where only one vented cast iron brake disc was previously possible. The openings 36 and 38 of the discs 22 and 24 provide a ventilation passage as will be described later. An annular air deflector 48 is provided on adapter sleeve 16 in the plane of the housing wall 28.

The brake shoe 50 includes an annular backing plate 52 axially movable within the housing 18 to which is mounted a brake lining 54. The backing plate 52, brake lining 54, and annular brake lining 56 are provided with peripheral slots and teeth which engage between bolts 34 of the housing to restrain them from rotation but to allow them to slide axially. The brake lining 54 is adapted to frictionally engage the planar radial disc surface 22A. Annular brake lining 56 is provided between the discs 22 and 24 while annular brake lining 58 is mounted to the housing wall 28. Annular spacing rings 152 are provided in the housing wall 30 and on the removal of the spacing rings 152 the housing will be reduced in axial dimension, thereby compensating for the wear on the linings 54, 56 and 58, and the wear on disc 22 and 24, as will be described later.

An intermediate wall 62 is mounted to the mounting ring 20 on the axle 10. The intermediate wall 62 also serves to support the housing wall 26 by means of the nut and bolt arrangements 74 and 34. Ventilation channels 64 are provided in the intermediate wall 62 while axial ventilation openings 148 are provided in spaced apart relationship near the inner opening of the annular intermediate wall 62.

In the present embodiment a housing plate 66 is placed against the intermediate wall 62 and is bolted thereto by means of nut and bolt arrangements 74 and 34 as shown. This housing plate 66 acts to support the bladder 68. Bladder 68 is an annular bladder made of stainless steel sheets, welded together as shown in FIG. 2. Air under pressure is fed to the bladder 68 through the tube 106 and inlet 108. Other gases may also be used to inflate the bladder.

The spring abutment member 92 is mounted for axial movements relative to the intermediate wall 62. The spring abutment member 92 is in the form of a spider with legs 94 spaced about the periphery of an annular plate 92A and integral therewith. The legs 94 extend through openings 72 in the intermediate wall 62. The legs 94 engage the backing plate 52 near the peripheral edge thereof. In view of the stresses on the peripheral edge of the backing plate 52, the backing plate 52 may be constructed with a slight flare in the direction of the legs to compensate for the stresses which would apply when the legs 94 come into contact at the peripheral edge of the backing plate 52. The ends of legs 94 might also be provided with a slight beveled angle 94a to compensate for such stresses as shown in FIG. 1a.

Springs 90 urge the spring abutment plate 92 towards the brake shoe 50. A plurality of springs 90 are provided in annular spaced apart locations on the housing wall 26, each within a bell cover 78 fitted within a respective opening 76 on the wall 26. The bell covers 78, in one embodiment have a rotary bayonet type of connection to engage the housing wall 26 so that they can be removed in order to replace the springs 90 for instance. A nut 80 having a flange 82 is provided exteriorly of the bell cover 78. The nut 80 engages the threads of bolt 84. The head of the bolt 84 is in a blind sleeve 86 which has a flange 88 and which abuts the coil spring 90. Thus, if it is necessary to remove the tension of the springs 90 against the spring abutment plate 92 the nut 80 is rotated to point where the head of the bolt 84 moves the blind sleeve 86 towards the left in FIG. 1 thereby releasing the spring 90 from the spring abutment member 92. The nut 80 has a rivet shoulder 80A to retain the nut to the bell cover 78. Although a coil spring 90 is shown, other types of springs such as an annular disc spring may be used.

A bladder 70 is contemplated between the intermediate wall 62 and the backing plate 52 of brake shoe 50. The bladder 70 may be supplied with a gaseous fluid under pressure by an inlet similar to inlet 108 and tube 106.

The end edge of the sleeve 16 may be provided with teeth and an antilock-brake sensor or counter sensor 150 may be mounted to the intermediate wall 62 as shown in FIG. 1 for the purpose of sensing the movement of the teeth 151 as the adapter sleeve 16 rotates.

As shown in FIG. 2 the brake assembly is provided with a thermal sensor 102 connected to the intermediate wall 62 and having a lead 104. A thermal sensor 100 may be provided on the housing wall 28 with a lead 105 extending through a passage 96 provided for in the housing wall 30. The thermal sensors 100 and 102 can provide temperature data with respect to the heat generated in the disc brake assembly, particularly near the disc. For instance the sensor 100 is right at the housing wall 28 next to the brake lining 58 near the disc 24. The thermal sensor 102 will indicate the temperature of the intermediate wall 62. Other sensors may be provided. The sensors 100 and 102 communicate with a temperature indicator on the control panel in the vehicle. Only one wheel may need be monitored in such a manner as it will give an indication of the type of heat generated in all the wheels of the same vehicle.

A warning device, connected to the brake thermal sensors, may be provided on the control panel in the cab. The warning device may be an audible signal such as a buzzer or a recorded voice, or a visual diode graphic screen with different colours to provide information on the temperature of the brakes. As is well known when the temperature of the brakes reaches a certain temperature, the brake pads begin to break down chemically, causing brake fading. The warning device could alert the operator to stop the vehicle in order to allow the brakes to cool down before the brakes reach a temperature level that might cause failure.

Another feature provided in the brake assembly described herein is a wear sensor as shown in FIGS. 2 and 3. Because of the particular axial movement of the present brake assembly a wear sensor can be provided between the housing wall 26 and the spring abutment member 92 and the distance between the two elements measured, particularly when the brakes are applied through the parking brakes under the urging of springs 90.

In one embodiment as shown in FIG. 2 the wear sensor 112 includes a rubber cap 114 and a plunger 116 urged by a spring 118 within a blind sleeve 120. A bearing sleeve 122 is provided within the sleeve 120 to allow the plunger to slide towards the spring abutment member 92 under the urging of the spring 118. The plunger is provided with a flange 124 to receive the spring 118.

Another form of wear sensor is shown in FIG. 3. Wear sensor 130 is an electronic sensor including a plunger 132, spring mounted within the sensor 130, and urged against the spring abutment member 92. Sensor 130 communicates with a brake wear indicator on the control panel in the cab. Only one wheel need be monitored as it give a reliable indicator of the amount of wear occurring at all the wheels of a vehicle.

A still further wear sensor could be provided by allowing an opening in the housing wall 26, closed by a rubber nipple 110. When the rubber nipple is removed a measuring gauge can be inserted to determine the distance between the wall 26 and the spring abutment member 92 when the parking brake is applied.

With the use of the brake wear sensors or gauges a warning device can be provided on the control panel in the cab of the vehicle which would include an audible signal such as a buzzer when the brake linings and discs have been worn to a predetermined level to at least warn the operator to replace the brake linings and discs or at least plan the maintenance thereof. It may even be contemplated to provide an interlock which would intervene at the parking brake control valve to impede the release of the parking brakes when the brake wear has exceeded accepted levels of wear. In any event the brake wear system can give warning or control at different levels of brake wear.

A quick release valve 126 is located on the intermediate wall 62 and communicates with the bladder 70. The quick release valve 126 will operate when it is required to deflate the bladder 70. At the same time the exhaust from the quick release valve will be directed along the intermediate wall 62 through ventilation channels 64 thereby enabling the intermediate wall 62 to be cooled as well as the adjoining parts of the housing such as housing plate 66. The gas under pressure within the bladder 70 cools during decompression as it is released.

On the other hand a choke or restricted passage 106A is provided on the conduit 106 to provide a slow release from the bladder 68 in order to avoid sudden violent application of the safety brakes while the vehicle is moving if a service brake malfunction should occur. A time delay valve might also be provided instead of the choke.

Figure 4:
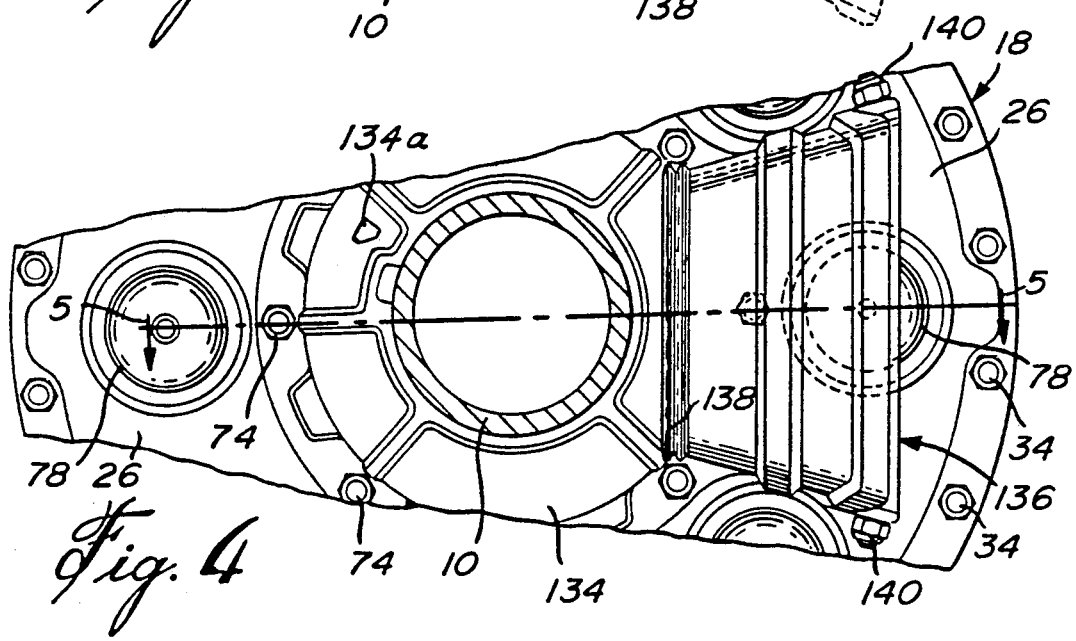
FIG. 4 is an enlarged fragmentary front elevation of the brake assembly.

A ventilation system for the disc brakes is provided. As partially, previously described and shown in FIGS. 1 and 9, openings 148 are located in the intermediate wall 62 and as shown in FIG. 4 a plenum 134, in the form of an annular cover, may be placed over the openings 148. The plenum 134 communicates with a scoop 136. The scoop 136 may be mounted on the housing wall 26 and would be facing the normal direction of travel of the vehicle so that air flow would be deflected into the plenum 134, through the openings 148 to the discs 22 and 24 and in particular through the openings 36 and 38. Because of deflector or baffle 48 the air would be forced upwardly through the ventilation channels 46 of the discs 22 and 24. The baffle 48 could be eliminated if the disc 24 is closed to the adapter sleeve 16. The discs 22 and 24 act as impellers creating a negative pressure in the area of the openings 36 and 38 thereby drawing air and pumping it to the periphery of the discs and exhausting it through the ventilation openings 32 allowing a great amount of heat to be dissipated in this way. The scoop 136 and the plenum 134 may be a molded plastic member with a hinge 138 molded therein along with nut and bolt adjustments 140 to open or reduce the opening of the scoop 136.

It has been contemplated to use this ventilation system for a different purpose, such as in an aircraft utilization. Accordingly, by providing a similar brake configuration on the wheels of the landing gear of an aircraft, that is with scoop 136, ventilation openings 32 and ventilated discs 22 and 24, a considerable flow of air can be passed through the (released) brakes ventilation system causing the wheels to rotate. It is particularly useful to have the wheels rotating at an equivalent ground speed, at the moment of landing. In order to control the rate of rotation of the wheels, that is so that they do not over-rotate, the scoop 136 may be remotely adjusted and the active brakes could be applied. The wheel speed may be calibrated to the ground speed of the aircraft using a microprocessor using information from the counter sensor 150 and the aircraft ground speed data. The precise rate of rotation could be achieved by having the microprocessor modulate the scoop opening and the brakes to compensate for the excess of torque generated by the air flow through the brakes. This would be an important safety factor with respect to aircraft tires.

Figure 6:
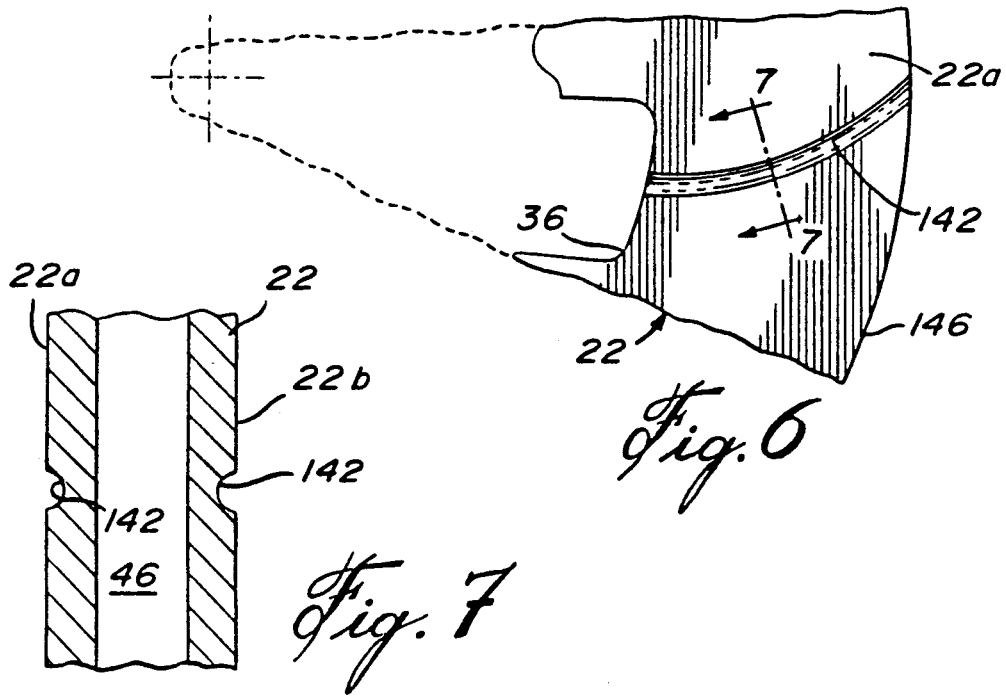
FIG. 6 is an enlarged fragmentary side elevation of a detail of the present invention.
Figure 7:
FIG. 7 is an enlarged fragmentary vertical cross-section taken along lines 7—7 of FIG. 6.

A fragment of a brake disc 22 is shown in FIGS. 6 and 7 with the surfaces 22A and 22B illustrated. A groove 142 extends somewhat radially of the surfaces 22A and 22B and has a semi-circular cross-section. In a specific example, the groove may be 0.09" in depth with a width of 0.25" and a radius of ⅛ of an inch. It has been found that the provision of such a groove allows air to enter, when the brakes are released and the discs are rotating, to form a slight air cushion between the brake linings and the friction surface on the disc, thereby eliminating dragging and helping to cool the friction surfaces. At the same time the groove allows the brake surfaces to be cleaned by providing a drainage channel for any liquid forming on the brake linings or debris between the friction surface of the disc and the linings.

It has also been found that by providing a coating on the disc brake surface the heat is more easily dissipated. This coating may be a ceramic with aluminum particulates mixed therein and which has a particular heat sink and wear resistance properties. The coating may also be titanium carbo-nitride or chromium carbide. A coating is presently being developed by "SERMATECH INTERNATIONAL INC." for military purposes.

It has also been contemplated to provide a spray mix where water is sprayed into the plenum 134 through opening 134a to mix with ventilation air being deflected into the brake assembly to enhance the cooling of the brake assembly.

In the present embodiment, and as shown in FIG. 8, the bladder 70, which is in the form of an annular bellows is provided with an external annular dust cap 70a and an internal dust cap 70b. The dust caps 70a and 70b are provided to prevent debris from entering between the accordion like fins formed in the bellows-like bladder.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A disc brake assembly for a vehicle wheel wherein the wheel includes a hub journaled to an axle on the vehicle, the disc brake assembly is within the confines of the wheel and concentric with the axle, the disc brake assembly comprising a housing mounted to the vehicle and at least a radial disc within the housing and means mounting the disc to the wheel, the disc having at least a first radial planar friction surface, a first brake shoe provided adjacent the first planar friction surface of the disc, movable axially towards and away from the first friction surface of the disc, for friction engagement therewith and release thereof, means provided for restraining the first brake shoe from rotating with the disc, an intermediate wall mounted within the housing and fixed thereto extending parallel with the radial disc and located such that the first brake shoe moves axially between the intermediate wall and the radial disc, movable spring abutment means mounted for axial movement within the housing between the intermediate wall and the housing such that the intermediate wall is between the movable spring abutment means and the first brake shoe, pusher link members extending between the spring abutment means and the first brake shoe passing through the intermediate wall such that the first brake shoe moves axially with the spring abutment mans, spring means extending between the housing wall and the spring abutment means such that the spring means urges against the spring abutment means to press the first brake shoe against the first friction surface of the disc in a safety brake mode, a first gaseous fluid bladder being provided between the intermediate wall and the spring abutment means whereby the first bladder when expanded forces the spring abutment means to overcome the spring means to release the first brake shoe from the first friction surface of the disc to release the safety brake mode, a second gaseous fluid bladder being provided between the intermediate wall and the first brake shoe such that when service brakes are applied the second bladder is expanded so as to urge the first brake shoe to the first friction surface of the disc, a housing plate at one end of the first bladder, the housing plate being located between the housing and the intermediate wall, and quick release valve means being mounted to the intermediate wall and communicating with the second bladder for evacuating gaseous fluid from the second bladder to accelerate the rate of modulation of the second bladder.

2. The brake assembly as defined in claim 1, further comprising ventilation channels provided in the intermediate wall, the ventilation channels extending along the housing plate and being separated from the first bladder by the housing plate and from the second bladder by the intermediate wall, the fluid being evacuated from the second bladder to the ventilation channels by the quick release valve means to cool both the intermediate wall and the housing plate.

3. The brake assembly as defined in claim 2, wherein the ventilation channels are between the first and second bladders and wherein the pusher link members are located proximate to both the first and second bladders.

4. The brake assembly as defined in claim 2, wherein the first bladder is between the spring abutment means and the housing plate, the ventilation channels are between the housing plate and the intermediate wall, and the intermediate wall is between the housing plate and the second bladder.

5. The brake assembly as defined in claim 2, wherein the ventilation channels are between the first and second bladders and wherein the pusher link members are located proximate to both the first and second bladders.

6. The brake assembly as defined in claim 2, wherein the first bladder is between the spring abutment means and the housing plate, the ventilation channels are between the housing plate and the intermediate wall, and the intermediate wall is between the housing plate and the second bladder.

7. The brake assembly as defined in claim 1, further comprising temperature sensors provided on at least one of the intermediate wall and a housing wall near the disc in order to determine the temperature of the brake assembly.

8. The brake assembly as defined in claim 1, further comprising dust caps provided along inner and outer margins of the first and second bladders.

9. The brake assembly as defined in claim 1, wherein ends of the pusher link members are provided with a slight beveled angle.

10. The brake assembly as defined in claim 1, wherein the brake shoe includes an annular backing plate, the second bladder extending between the annular backing plate and the intermediate wall, a brake lining being applied directly to the annular backing plate, and the pusher link members directly engaging the annular backing plate.

11. The brake assembly as defined in claim 1, wherein the first bladder engages the housing plate at a first end thereof and engages the spring abutment means at a second end thereof, the first and second ends of the first bladder being opposite one another.

12. The brake assembly as defined in claim 1, wherein the first bladder engages the housing plate at a first end thereof and engages the spring abutment means at a second end thereof, the first and second ends of the first bladder being opposite one another.

13. The brake assembly as defined in claim 1, wherein the first bladder is an annular bladder made of stainless steel sheets welded together.

14. The brake assembly as defined in claim 1, wherein the first and second bladders both have a bellows shape.

15. The brake assembly as defined in claim 1, wherein the pusher link members are located exteriorly of the first and second bladders such that an interior of the first bladder and an interior of the second bladder are out of contact with the pusher link members.

16. A disc brake assembly for a vehicle wheel wherein the wheel includes a hub journaled to an axle on the vehicle, the disc brake assembly is within the confined of the wheel and concentric with the axle, the disc brake assembly comprising:

a housing mounted to the vehicle and at least a radial disc within the housing and means mounting the disc to the wheel, the disc having at least a first radial planar friction surface;

a first brake shoe provided adjacent the first planar friction surface of the disc, movable axially towards and away from the first friction surface of the disc, for friction engagement therewith and release thereof;

means provided for restraining the first brake shoe from rotating with the disc;

an intermediate wall mounted within the housing and fixed thereto extending parallel with the radial disc and located such that the first brake shoe moves axially between the intermediate wall and the radial disc;

movable spring abutment means mounted for axial movement within the housing between the intermediate wall and the housing such that the intermediate wall is between the movable spring abutment means and the first brake shoe;

spring means extending between the housing wall and the spring abutment means;

a first fluid bladder being provided between the intermediate wall and the spring abutment means whereby the first bladder when expanded forces the spring abutment means to overcome the spring means to release the first brake shoe from the first friction surface of the disc to release the safety brake mode;

a second bladder being provided between the intermediate wall and the first brake shoe such that when service brakes are applied to expand the second bladder so as to urge the first brake shoe to the first friction surface of the disc;

pusher link members extending between the spring abutment means and the first brake shoe passing through the intermediate wall such that the first brake shoe moves axially with the spring abutment means, such that the spring means urges against the spring abutment means to press the first brake shoe against the first friction surface of the disc in a safety brake mode, the pusher link members being located exteriorly of the first and second bladders such that an interior of the first bladder and an interior of the second bladder are out of contact with the pusher link members; and quick release valve means being mounted to the intermediate wall and communicating with the second bladder for evacuating fluid from the second bladder to accelerate the rate of modulation of the second bladder.

17. The brake assembly as defined in claim 16, further comprising temperature sensors provided on at least one of the intermediate wall and a housing wall near the disc in order to determine the temperature of the brake assembly.

18. The brake assembly as defined in claim 16, further comprising dust caps provided along inner and outer margins of the first and second bladders.

19. The brake assembly as defined in claim 16, wherein ends of the pusher link members are beveled.

20. The brake assembly as defined in claim 16, wherein the brake shoe includes an annular backing plate, the second bladder extending between the annular backing plate and the intermediate wall, a brake lining being applied directly to the annular backing plate, and the pusher link members directly engaging the annular backing plate, the pushing link members extending from the spring abutment means to the annular backing plate of the brake shoe, the pushing link members extending past the first bladder, the intermediate wall and the second bladder.

21. The brake assembly as defined in claim 16, wherein the first bladder is an annular bladder made of stainless steel sheets welded together and wherein the first and second bladders both have a bellows shape.

22. A disc brake assembly for a vehicle wheel on a vehicle wherein the wheel includes a hub journaled to an axle on the vehicle, the disc brake assembly is within the confines of the wheel and concentric with the axle, the disc brake assembly including a housing mounted to the vehicle and at least a radial disc within the housing, and means mounting the disc to the wheel, the disc having at least a first radial planar friction surface and first brake shoe provided adjacent the first planar friction surface movable axially towards and away from the first friction surface of the disc for friction engagement therewith and release thereof, an intermediate wall member mounted within the housing and fixed thereto and extending parallel with the radial disc and located such that the first brake shoe moves axially between the intermediate wall and the radial disc, means provided for restraining the first brake shoe from rotating with the disc, a gaseous fluid bladder being provided between the intermediate wall and the first brake shoe such that when service brakes are applied, the bladder is expanded so as to urge the first brake shoe to the first friction surface of the disc, movable spring abutment means mounted for axial movement within the housing between the intermediate wall and a housing wall such that the intermediate wall is between the movable spring abutment means and the first brake shoe, rigid pusher link members extending between the spring abutment means and the first brake shoe and passing by the intermediate wall such that the first brake shoe moves axially with the spring abutment means, a spring means extending between the housing wall and the spring abutment means such that the spring means urges against the spring abutment means to press the first brake shoe against the first friction surface of the disc in a safety brake mode, quick release valve means being mounted directly to the intermediate wall and communicating with the bladder for evacuating gaseous fluid from the bladder to accelerate the rate of modulation of the bladder.

* * * * *